(12) United States Patent
Yang

(10) Patent No.: US 6,747,634 B1
(45) Date of Patent: Jun. 8, 2004

(54) ASSEMBLY OF MOUSE WITH TRACKBALL DEVICE PERMITTING SELECTION OF THE POSITION OF A CHOSEN RECEIVER

(76) Inventor: Tai-Her Yang, No. 59, Chung Hsing 8 St., Si-Hu Town, Dean-Hwa (TW)

( * ) Notice: Subject to any disclaimer, the term of this patent is extended or adjusted under 35 U.S.C. 154(b) by 107 days.

(21) Appl. No.: 09/709,647

(22) Filed: Nov. 13, 2000

(51) Int. Cl.$^7$ .................................. G09G 5/00
(52) U.S. Cl. ................ 345/168; 345/156; 345/163
(58) Field of Search ................. 345/156, 168, 345/169, 173, 163; D14/333

(56) References Cited

U.S. PATENT DOCUMENTS

| | | | | |
|---|---|---|---|---|
| 5,628,483 A | * | 5/1997 | Smith et al. ............... 248/118 |
| 5,655,743 A | * | 8/1997 | Gillis .................. 248/346.01 |
| 5,667,320 A | * | 9/1997 | Ambrose et al. ......... 248/118.3 |
| 5,880,712 A | * | 3/1999 | Goldman ................... 345/168 |
| 5,886,686 A | * | 3/1999 | Chen ...................... 345/168 |
| 5,892,503 A | * | 4/1999 | Kim ....................... 345/168 |
| 5,926,169 A | * | 7/1999 | Church et al. ............. 345/156 |
| 6,163,326 A | * | 12/2000 | Klein et al. .............. 345/156 |
| 6,164,852 A | * | 12/2000 | Nishijima et al. .......... 345/168 |
| 6,232,960 B1 | * | 5/2001 | Goldman ................... 345/168 |
| 6,288,706 B1 | * | 9/2001 | Leman ...................... 341/22 |
| 6,304,250 B1 | * | 10/2001 | Yang et al. ................ 341/22 |
| 6,373,471 B1 | * | 4/2002 | Lin ....................... 345/168 |
| 6,384,812 B1 | * | 5/2002 | Dunn ...................... 345/156 |
| 6,392,634 B1 | * | 5/2002 | Bowers et al. ............. 345/163 |
| 6,424,335 B1 | * | 7/2002 | Kim et al. ................ 345/158 |
| 6,476,795 B1 | * | 11/2002 | Derocher et al. ........... 345/163 |
| 6,545,668 B1 | * | 4/2003 | Hayama ................... 345/172 |

* cited by examiner

*Primary Examiner*—Amr Awad
*Assistant Examiner*—Alecia D. Nelson
(74) *Attorney, Agent, or Firm*—Bacon & Thomas, PLLC

(57) ABSTRACT

An integrated mouse or trackball system includes either a wired interface for the mouse or trackball device, or else a wireless receiver coupled to a wired or wireless relay keyboard. Positioning structures are included for optionally enabling the mouse or trackball device to be coupled to the interface device or receiver from either a right-hand or left-hand side of the keyboard, or from both sides of the keyboard. The positioning structures may including notches on left and right sides of the keyboard for accommodating leads or receivers, complementary pin/aperture sets for positioning receivers on either side of the keyboard or at a selected orientation at the center of the keyboard, or selectively positioned signal guiding means for guiding wireless signals from either the left or right side of the keyboard to a receiver positioned at a center of the keyboard.

22 Claims, 18 Drawing Sheets

ASSEMBLY OF MOUSE WITH TRACKBALL DEVICE PERMITTING SELECTION OF THE POSITION OF A CHOSEN RECEIVER

BACKGROUND OF THE INVENTION (a) Field of the Invention

This invention relates to a mouse or trackball device assembly that permits selection of the position of a receiver to provide a rational and neat, simplified desktop layout, the mouse or trackball device including a board-type interface providing electro-mechanical, photo-electrical, sensitizer, piezoelectric, capacitor, or static cursor control, with or without a ball.

(b) Description of the Prior Art

For quite some time, either keyboards, mice, and trackballs have been used as control interfaces for simple input of 15 computerized data. Traditionally, linkage of a computer main unit with a keyboard, mouse, or trackball has been accomplished by a wired or wireless means, with the wired linkage mode executed by having an independent lead run from the keyboard, mouse, or trackball individually to the computer main unit, or instead the keyboard, mouse, or trackball is built integrally with the main unit. As to the wireless mode of coupling, execution is either by way of a built-in receiver or else by external addition of a common or separate receiver for use with the keyboard, mouse, and/or trackball, the receiver being coupled through radio transmission to provide a cursor operation, scroll, or key-in function. A problem with the wired coupling employed by a conventional computer main unit in conjunction with a keyboard, mouse, trackball is that the plurality of leads in use and the relatively longer lead running distance can often result in leads intertwining each other in a mess. A problem with the wireless coupling mode, on the other hand, is that the necessity to install more devices causes difficulties related to device-to-device interaction, mutual shielding, and interference, and elevated costs, which is a real nuisance indeed.

SUMMARY OF THE INVENTION

This invention provides an integrated mouse or trackball assembly system having a receiver, the location of which may be determined at the user's option. Essentially, the invention provides for a receiver device incorporating a wired interface or a cordless receiver to be coupled to a relay keyboard assembly featuring a wired or cordless output capability, complete with a mechanism for mounting the receiver device laterally or in other directions, that is, characterized by the provision of a wired or cordless output relay keyboard assembly as an operational relay associating the receiver on the mouse or trackball device with the main unit, the wireless transmission including wireless coupling optionally utilizing infrared or ultrasound to allow for separate, independent manipulation of the mouse or trackball.

DETAILED DESCRIPTION OF THE PREFERRED EMBODIMENTS

Figure 2:
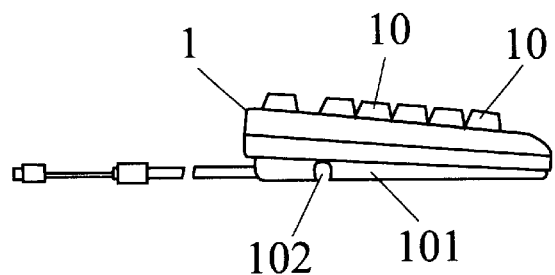
FIG. 2 is a side view of what is shown in FIG. 1.
Figure 1:
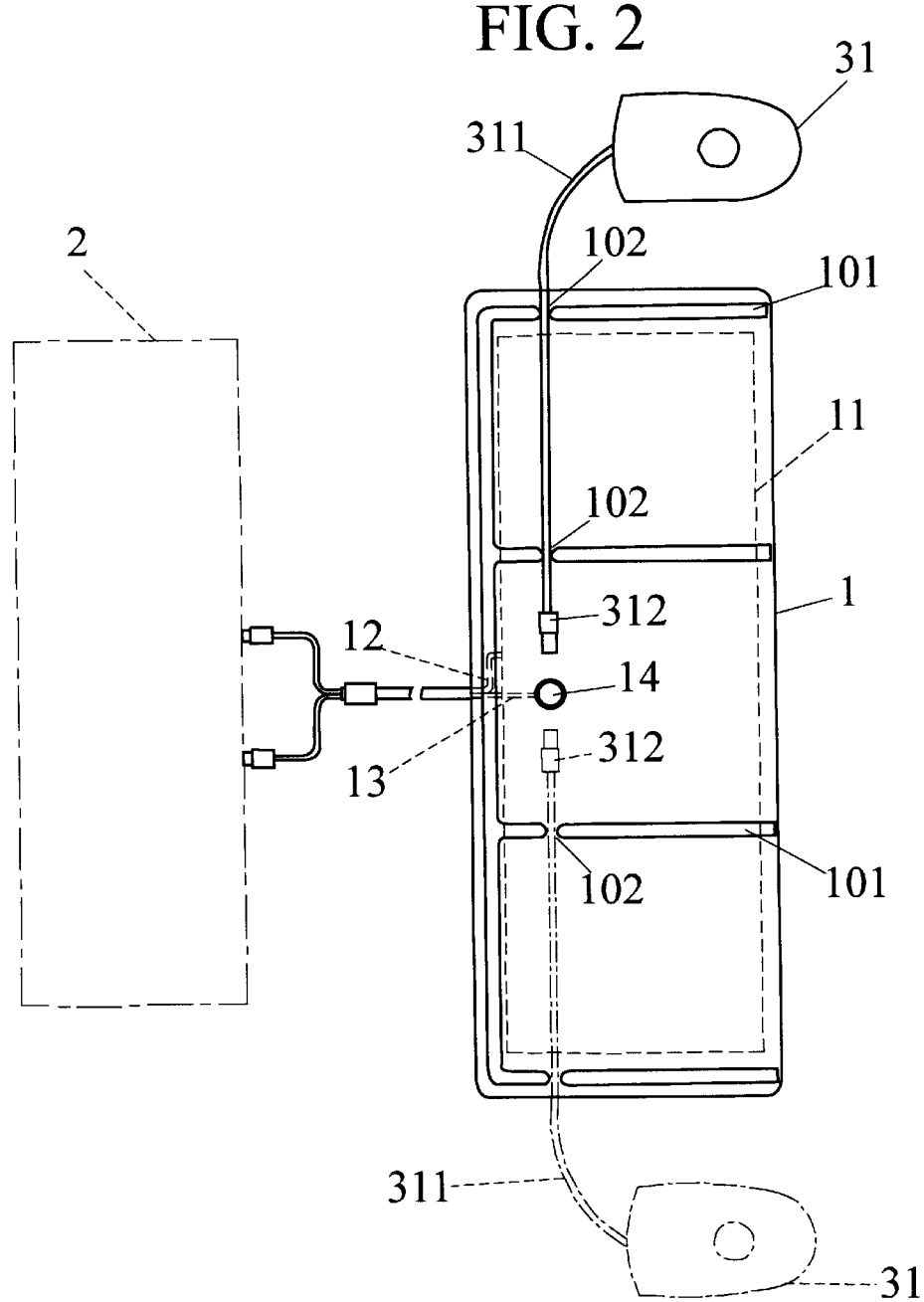
FIG. 1 is an illustration of the invention embodied in a wired coupling mode of execution.

Referring first of all to FIG. 1, and FIG. 2, a preferred assembly of mouse and trackball device permitting selection of the position of a chosen receiver, executed in a wired mode of coupling, includes a relay keyboard 1 which consists of operational keys 10 arranged to be pushed against a corresponding pushkey circuit 11 which is coupled to the main unit 2 by keyboard transmission wire 12. The relay keyboard 1 features wire retaining notches 102 on both sides of the bottom chassis 101, pointing leftwards or rightwards. A relay wire 13 is furnished on chosen locations inside the relay keyboard 1, lining tip side by side with keyboard transmission wire 12 or alternatively coaxially with a multiple-core cable for extension to the main unit 2, either directly or through a plug socket coupling technique. Coupling to the relay wire 13 is accomplished by means of one or more, homogenous or dissimilar conventional PS2, USB, serial or other special purpose interface sockets 14, connected in series or in parallel at a central position inside the relay keyboard (FIG. 1). Independently installed wired mouse or trackball device 31 is coupled by means of a plug 312 provided on the end of a transmission wire 311, for coupling with aforementioned coupling socket 14.

Structured accordingly, the plug 312 for the independently installed wired mouse or trackball device 31 may be coupled to the coupling socket 14 for the relay wire 13 on the right side, left side, or any other side of the relay keyboard 1, so that the transmission wire 311 may be retained in the retaining notch 102 on the bottom of the relay keyboard 1, thus achieving substantial reduction in the number of wires in use and the overall length of the transmission wire for the wired mouse or trackball device 31, and thereby saving the desktop from a mess.

Figure 4:
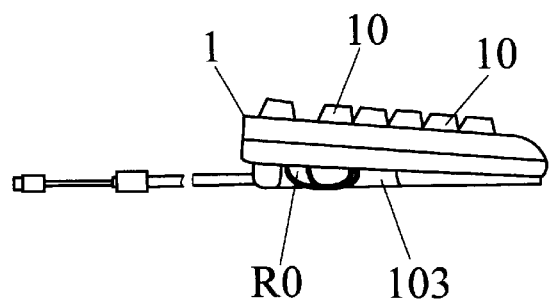
FIG. 4 is a side view of what is shown in FIG. 3.
Figure 3:
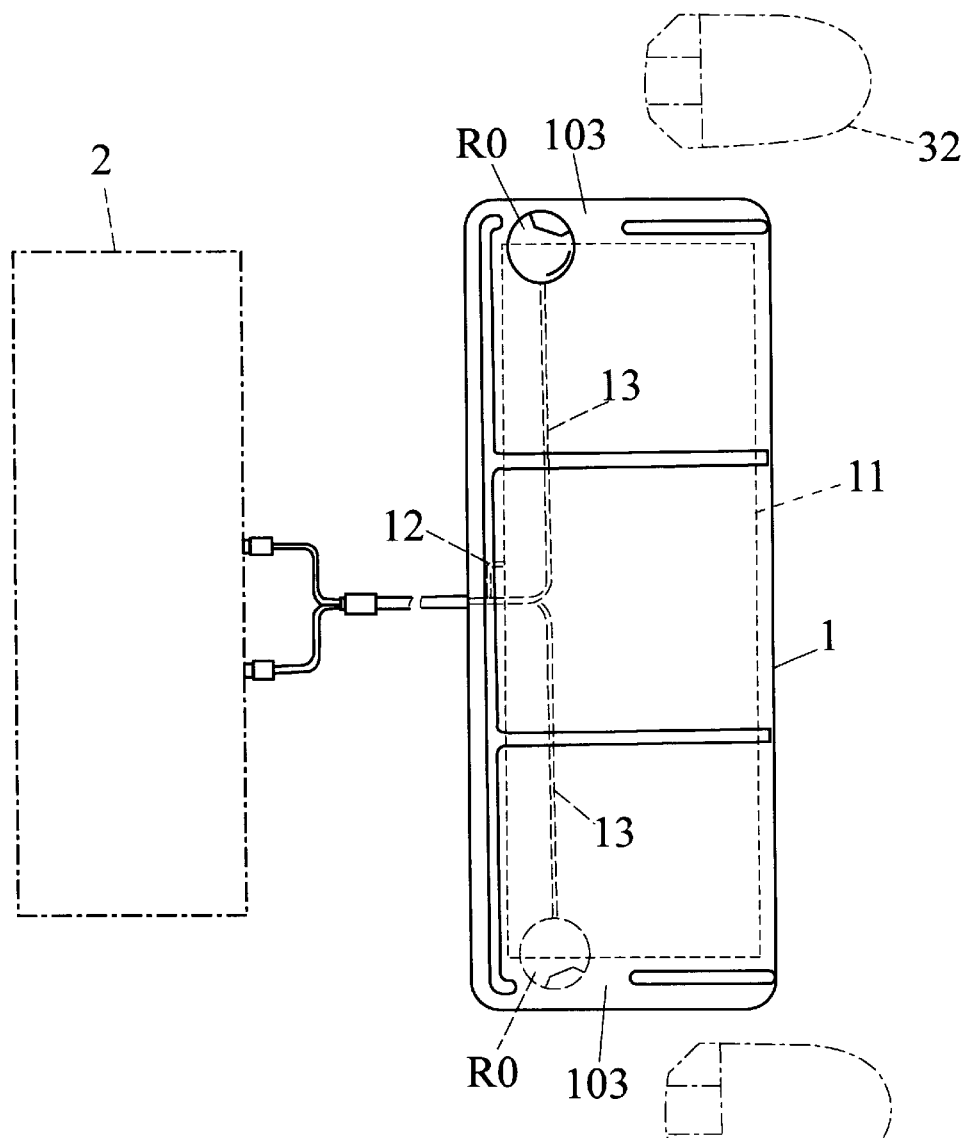
FIG. 3 is an illustration of the invention executed in a wireless transmission coupling mode under a first embodiment.

Referring next to FIG. 3 and FIG. 4, a first preferred embodiment of assembly of mouse with trackball device permitting selection of the position of a chosen receiver, and that includes a wireless mode of transmissive coupling utilizing, for example, infrared or ultrasound transmission, comprises a relay keyboard 1 which having operational keys 10 on the surface and corresponding key circuits 11 coupled to the main unit 2 by way of a keyboard transmission wire 12. The relay keyboard 1 features notches 103 to accommodate structures that facilitate wireless transmission on either side, or both sides of the chassis bottom. Relay wire 13 is concealed in a chosen position inside the relay keyboard 1, with one end thereof coupled to the infrared or ultrasound receiver R0, the other end lining up side by side with keyboard transmission wire 12 or coaxially with a multiple-core cable for direct connection or coupling by way of plug/socket assembly to the main unit 2. The relay wire 13 is available for coupling to either side of the relay keyboard 1, left or right, optionally from a point within the housing of the relay keyboard 1. The aforementioned infrared or ultrasound receiver R0 is coupled to the right side or left side of the relay keyboard 1 for ultimate coupling to the wireless transmission notch 103, where signals from an infrared or ultrasound wireless mouse or trackball device 32 are received, thereby accomplishing a wireless coupling in which keyboard 1 serves as an operational relay, avoiding the need for component-to-component shielding and eliminating interference while realizing a layout conducive to the creation of a clean wireless transmission desktop environment.

Figure 5:
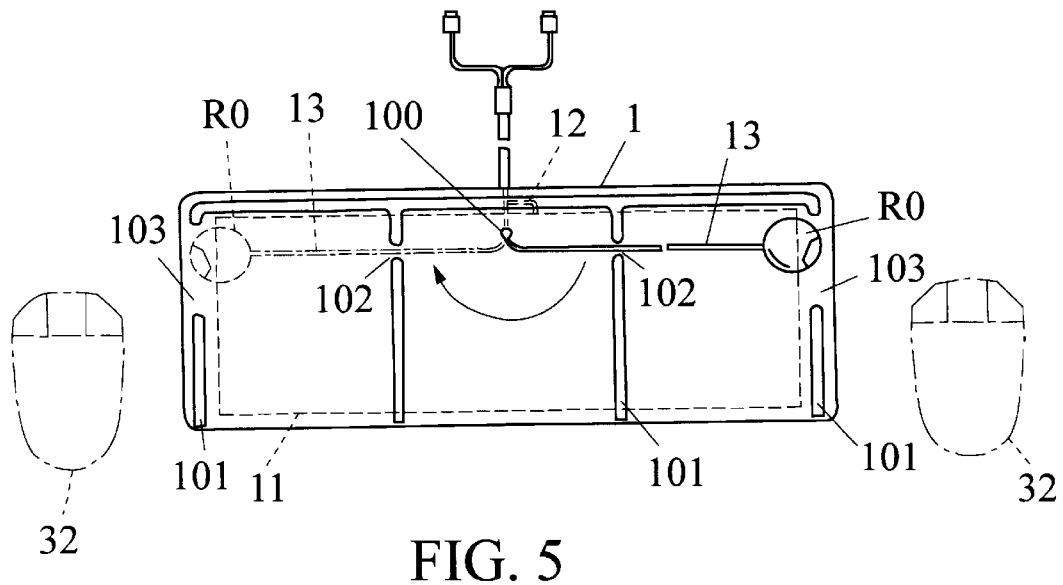
FIG. 5 is an illustration of the invention executed in wireless transmission coupling mode under a second embodiment.

Referring to FIG. 5, a second embodiment of the invention includes a relay keyboard 1 which consists of operational pushkeys 10 on the surface and corresponding pushkey circuits 11 built within. The pushkey circuits 11 are coupled to the main unit 2 by a keyboard transmission wire 12. The keyboard 1 further features wire retaining notches 102 at chosen locations on the chassis board 101, complemented with wireless transmission notches 103 provided on either side or both sides of the chassis. Relay wire 13 extends from the relay keyboard 1 with one end coupled to the infrared or ultrasonic receiver R0. The other end is directly coupled or coupled through a plug/socket assembly, to the main unit 2 by way of passage across hole 100, in parallel with keyboard transmission wire 12, or coaxially as part of a multiple-core cable. The relay wire 13 is retained in position across the retaining notch 102 on the bottom of the relay keyboard 1, while the above-mentioned infrared or ultrasonic receiver R0 is mounted on the notch 103 on the left side or right side of the relay keyboard 1 to receive a signal from the infrared or ultrasonic wireless mouse or trackball device 32.

Figure 6:
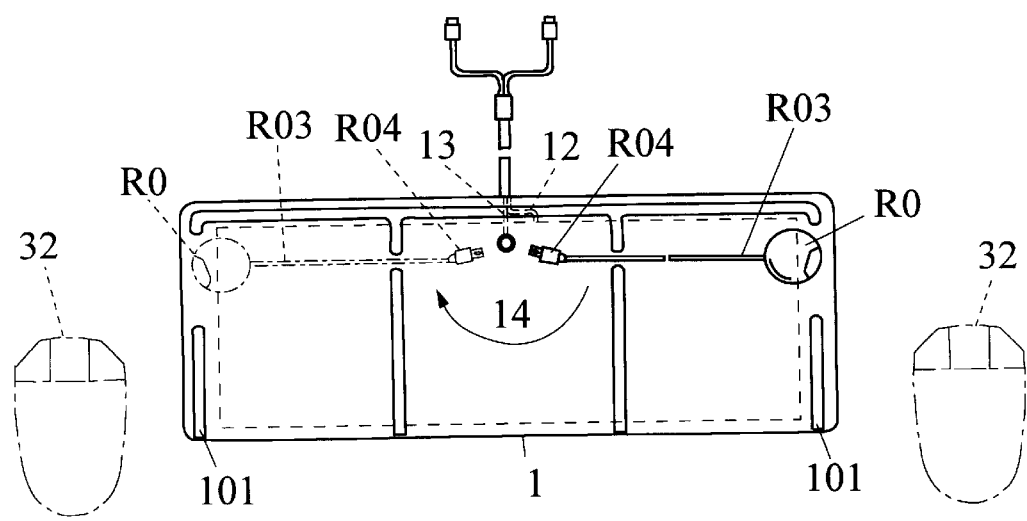
FIG. 6 is an illustration of the invention executed in wireless transmission coupling a wireless transmission coupling mode under a third embodiment.

In a third embodiment of the invention, illustrated in FIG. 6, a relay wire 13 corresponding to that of the second embodiment may further be connected to one or more similar or dissimilar, conventional PS2, USB, serial or other interface sockets 14 laid straight, in parallel, or by means of a coupling interface, in a chosen central position of the relay keyboard. A plug R04 may be coupled to the coupling socket 14 on one end of the transmission wire R03 of the infrared or ultrasound receiver R0, for optional mounting and coupling to a wireless transmission notch 103 on the right side or left of the relay keyboard 1, allowing for coupling from the relay wire 13 by way of the socket 14.

Figure 7:
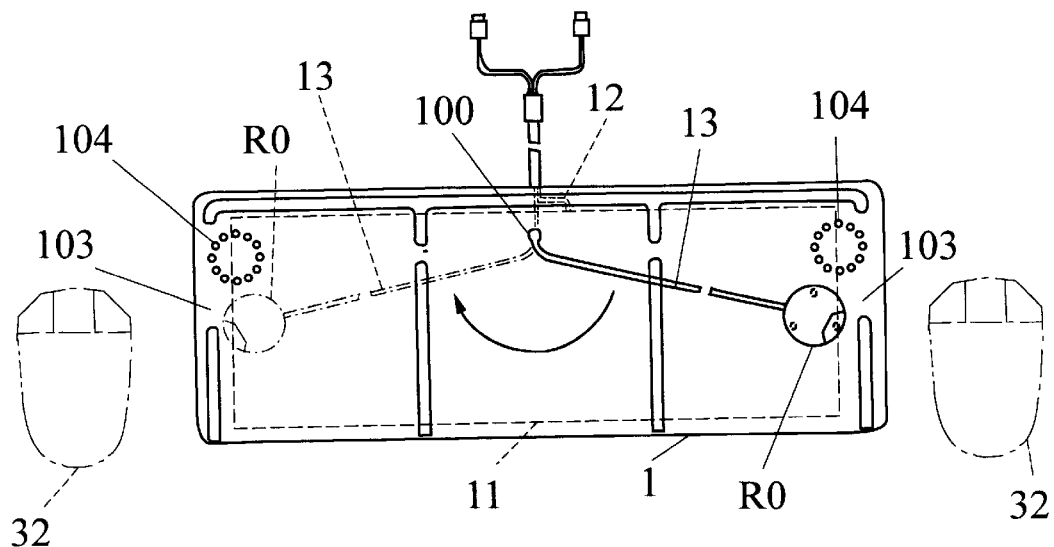
FIG. 7 is an illustration of the invention executed in a wireless transmission coupling mode under a fourth embodiment.
Figure 8:
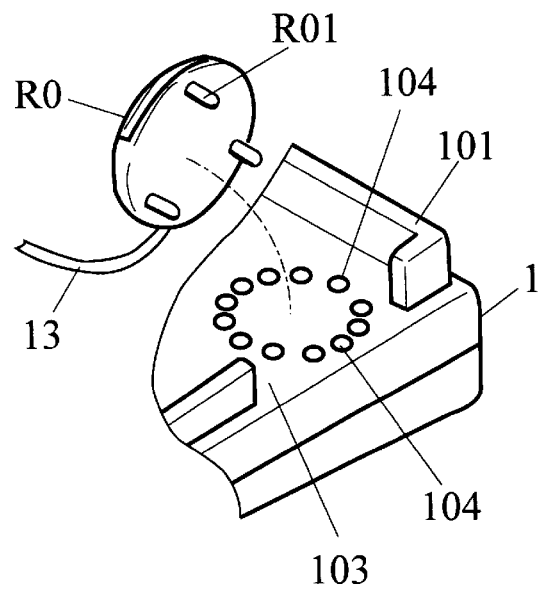
FIG. 8 is a partially taken three-dimensional perspective view of the fourth embodiment shown in FIG. 7.

According to a fourth embodiment of the invention, which is a variation of the embodiment of FIG. 5, as illustrated in FIG. 7 and FIG. 8 a plurality of holes 104 are laid out geometrically, in an annular or other configuration at a chosen location on the wireless transmission notches 103 on either or both sides of the relay keyboard 1, and are complemented with one or more corresponding pins R01 on the bottom of the housing of the infrared or ultrasound receiver R0, so that by matching pin R01 with pin-hole 104, it is possible to choose a desired signal pickup direction and to obtain stable securing effects.

Figure 9:
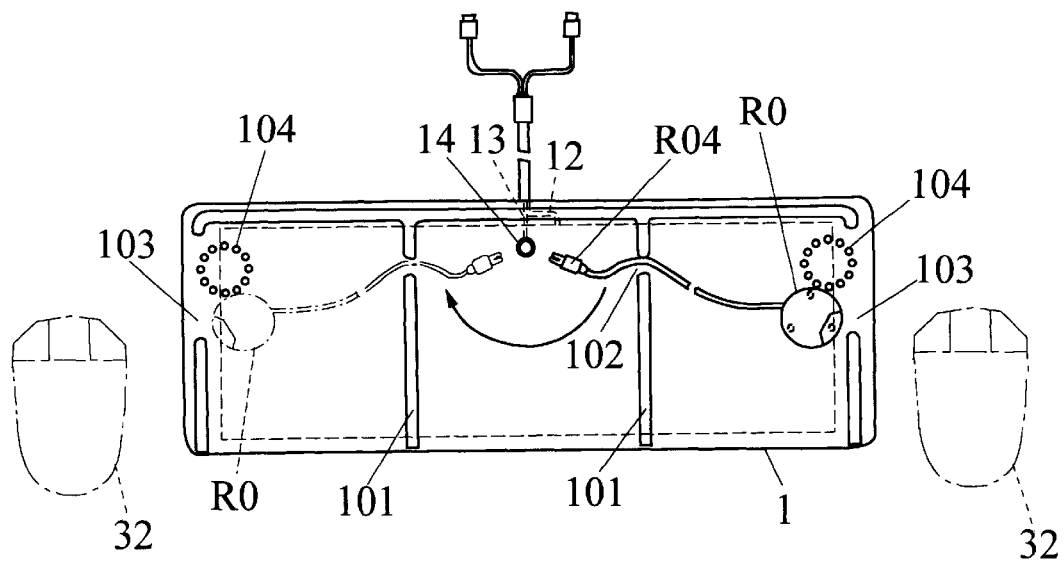
FIG. 9 is an illustration of the invention executed in a wireless transmission coupling mode under a fifth embodiment.
Figure 10:
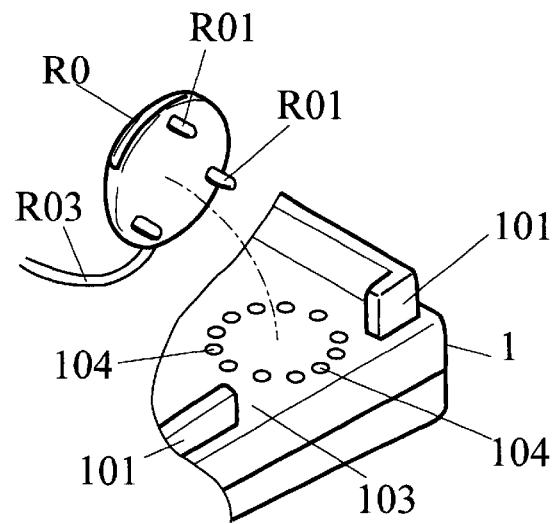
FIG. 10 is a partial three-dimensional perspective view of the fifth embodiment shown in FIG. 9.

Similarly, in a fifth embodiment of the invention which is illustrated in FIG. 9 and FIG. 10, and corresponds to the embodiment shown in FIG. 6, one or more annularly deployed or otherwise geometrically distributed pin-holes 104 are situated at chosen locations on the notch 103 in the right side or left side of the relay keyboard 1, and one or more complementary pins R01 are present on the bottom of the housing of independently installed infrared or ultrasound receiver R0, so that random coupling of pins R01 with pin-holes 104 will serve to set the signal pickup direction. It is further possible to provide one or more similar or dissimilar conventional PS2, USB, serial or any other special purpose interface sockets 14 at a central position inside the relay keyboard 1, to be coupled by a plug R04 provided on one end of the transmission wire R03 of the infrared or ultrasound receiver R0, to facilitate random selection of and coupling to the wireless transmission notch 103 on the left or right side of the relay keyboard 1.

Figure 11:
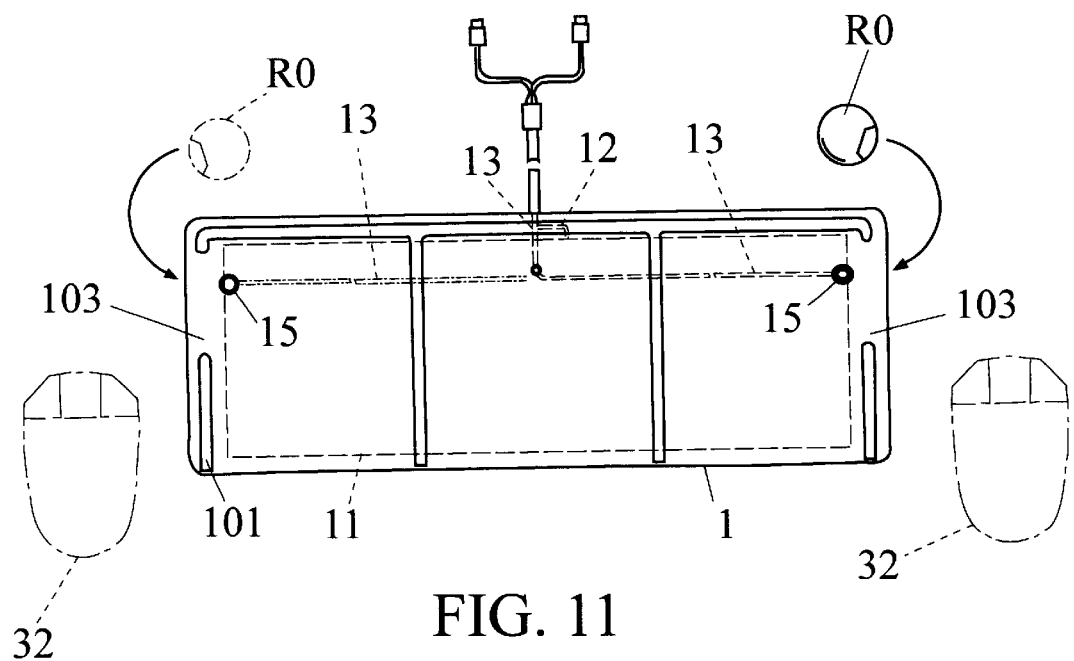
FIG. 11 is an illustration of the invention executed in a wireless transmission coupling mode under a sixth embodiment.
Figure 12:
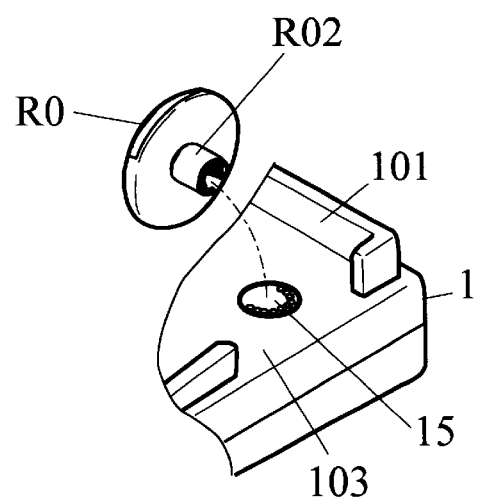
FIG. 12 is a partial three-dimensional perspective view of the sixth embodiment shown in FIG. 11.

Referring to FIG. 11 and FIG. 12, a sixth embodiment incorporating wireless transmission such as infrared or ultrasonic waves, comprises essentially a relay keyboard 1 which consists of operational pushkeys on the surface corresponding to a pushkey circuit 11 which in turn is coupled to the main unit 2 by way of a keyboard transmission wire 12, the keyboard 1 further featuring a wireless transmission notch 103 present on either side or both sides of the housing of the relay keyboard 1. A relay wire 13 is positioned at a chosen location within the relay keyboard 1 so that the mid-terminal lines up side by side with the keyboard transmission wire 12 or coaxially with a multiple-core cable, the relay wire extending straight to the main unit 2 or being connected therewith by way of a socket/plug assembly, while the other end of the relay wire 13 is coupled to a chosen location in the neighborhood of the wireless transmission notch 103. One or more similar or dissimilar conventional PS2, notch 103, USB, serial or any other special purpose interface sockets 15, meant for direct parallel or roundabout coupling interconnection, are attached for coupling to correspondingly provided PS2, USB, serial or other special purpose interface plug R02 to an infrared or ultrasound receiver R0 on the aforementioned right side or left side.

Figure 13:
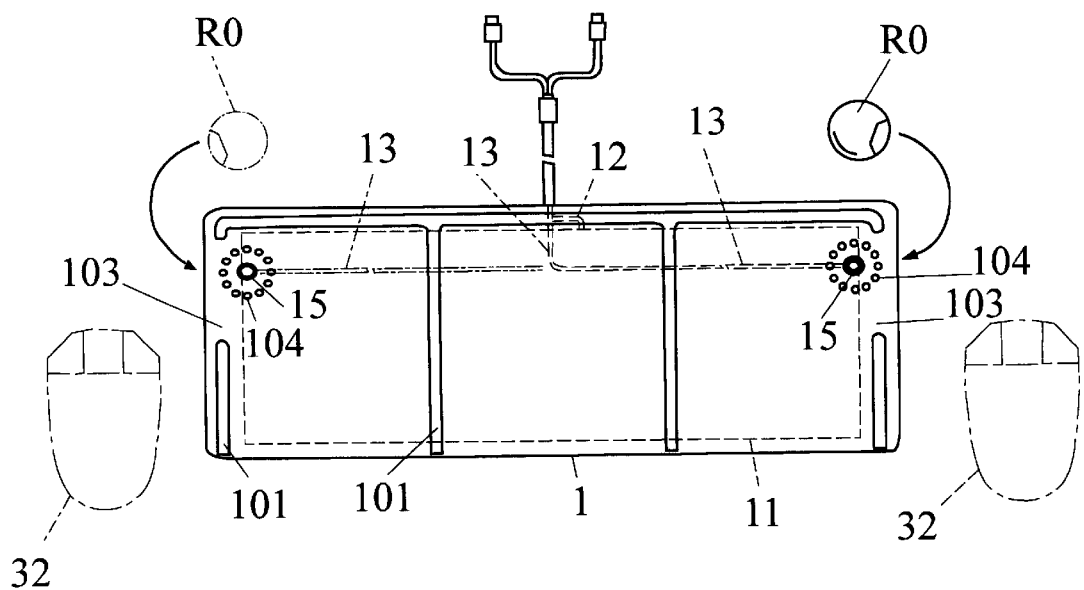
FIG. 13 is an illustration of the invention executed in wireless transmission coupling mode under a seventh embodiment.
Figure 14:
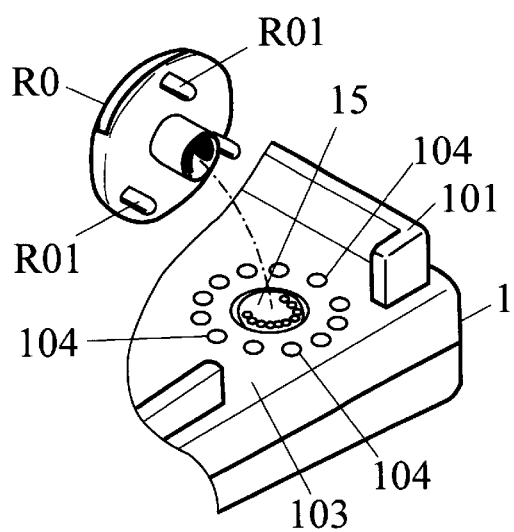
FIG. 14 is a partial three-dimensional perspective view of the seventh embodiment shown in FIG. 13.

In the seventh embodiment of the invention illustrated in FIG. 13 and FIG. 14, at a chosen location on the periphery of the PS2, USB, serial or special purpose interface socket 15 associated 10th the relay keyboard 1 pursuant to the embodiment illustrated in FIG. 11 and FIG. 12, are deployed, in an annular layout or other geometrical distribution, a plurality-of pin-holes 104 that correspond to one or more pins R01 deployed on the bottom of housing of the infrared or ultrasound receiver R0, so that by matching pins R01 with pin-holes 104, it is possible to randomly but securely set the signal emission angular position.

Figure 15:
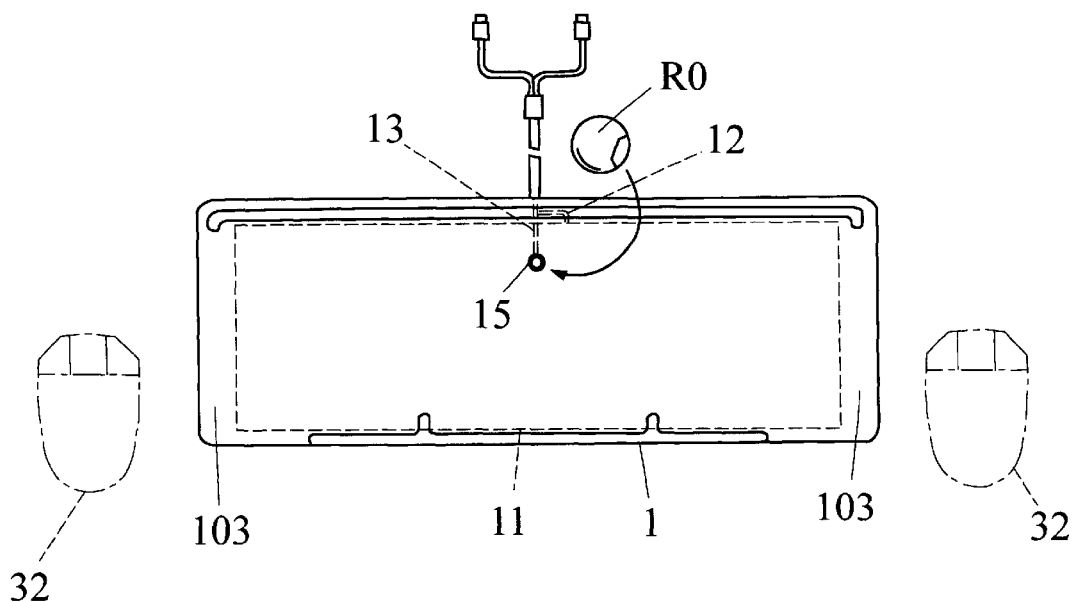
FIG. 15 is an illustration of the invention executed in wireless transmission coupling mode under an eighth embodiment.

FIG. 15 shows an eighth embodiment of the invention, including a relay keyboard 1 which consists of an operational pushkey 10 corresponding to a pushkey circuit 11 which is coupled by means of a keyboard transmission wire 12 to the main unit 2, the keyboard 1 providing for a larger wireless transmission notch 103 on either side or both sides of the bottom of the housing of the relay keyboard 1. Relay wire 13 is mounted at a chosen location within the relay keyboard 1, with one lend lining up side by side with keyboard transmission wire 12, or, coaxial with a multiple core cable for extension to or byway of a plug/socket assembly to the main unit 2, while the other end is coupled to a similar or dissimilar, conventional PS2, USB, serial or other special purpose interface socket 15, directly in parallel or through an interface coupling technique, the PS2, USB, serial or other special purpose interface socket 15 being available for mounting centrally on the relay keyboard 1 or any other chosen location where needed. In addition, the socket 15 may be coupled with any infrared or ultrasonic pickup receiver R0 furnished with a counterpart plug R02 corresponding thereto (as shown in FIG. 14), for receiving wireless signals from an independently installed infrared or ultrasonic wireless mouse or trackball device 32.

Figure 16:
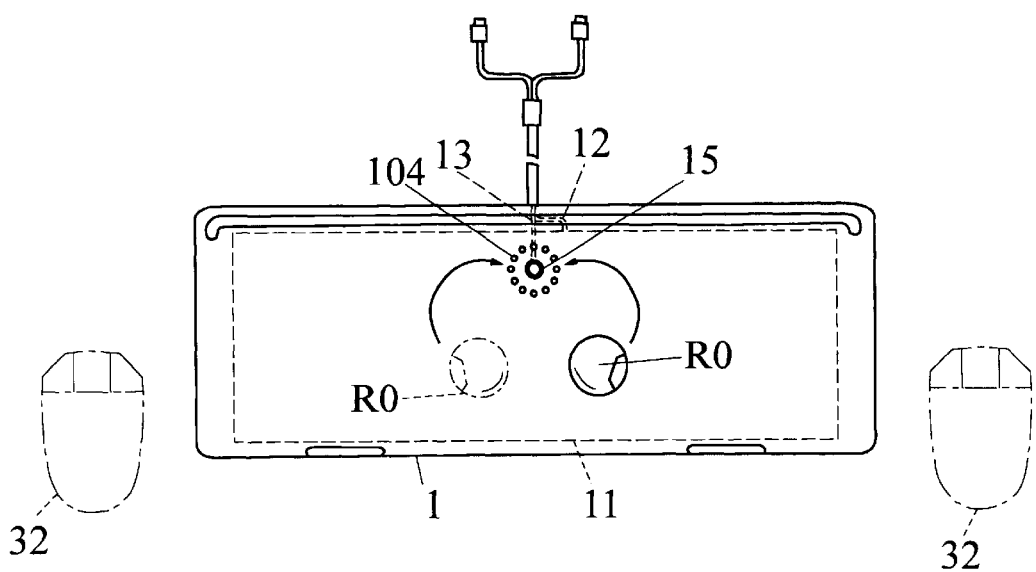
FIG. 16 is an illustration of the invention executed in wireless transmission coupling mode under a ninth embodiment.
Figure 17:
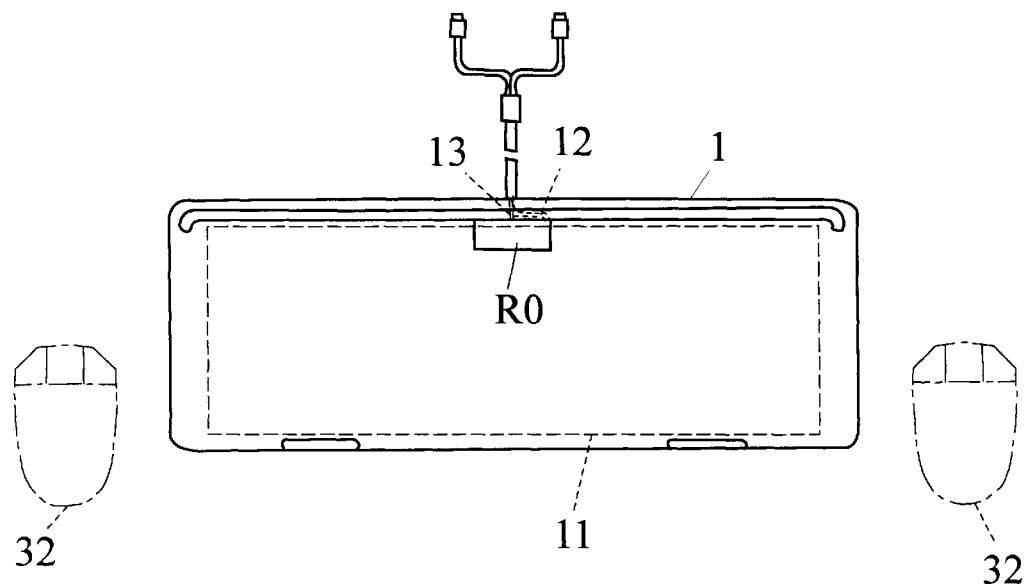
FIG. 17 is an illustration of the invention executed in wireless transmission coupling mode under a tenth embodiment.

FIG. 16 shows a ninth embodiment of the invention which enables selection of the position of the receiver of FIG. 15, in which a plurality of pin-holes 104, in an annular or otherwise geometric layout, are located around the PS2, USB, serial or other special purpose socket 15 of the relay keyboard 1, and arranged to cooperate with one or more pins R01, identical to the ones shown in FIG. 14, at corresponding locations on the bottom of housing of the infrared or ultrasound receiver R0, so that coupling of both pins R01 and pin-holes 104 with each other will suffice to securely set the signal emission direction in the tenth embodiment pursuant to FIG. 17, the infrared or ultrasound receiver R0 and the relay keyboard 1 are integral, instead of being separately structured, and mounted on the upper side of the bottom chassis of the relay keyboard 1 to pick up emission signals coming from the independently installed infrared or ultrasound wireless mouse or trackball device 32.

Figure 18:
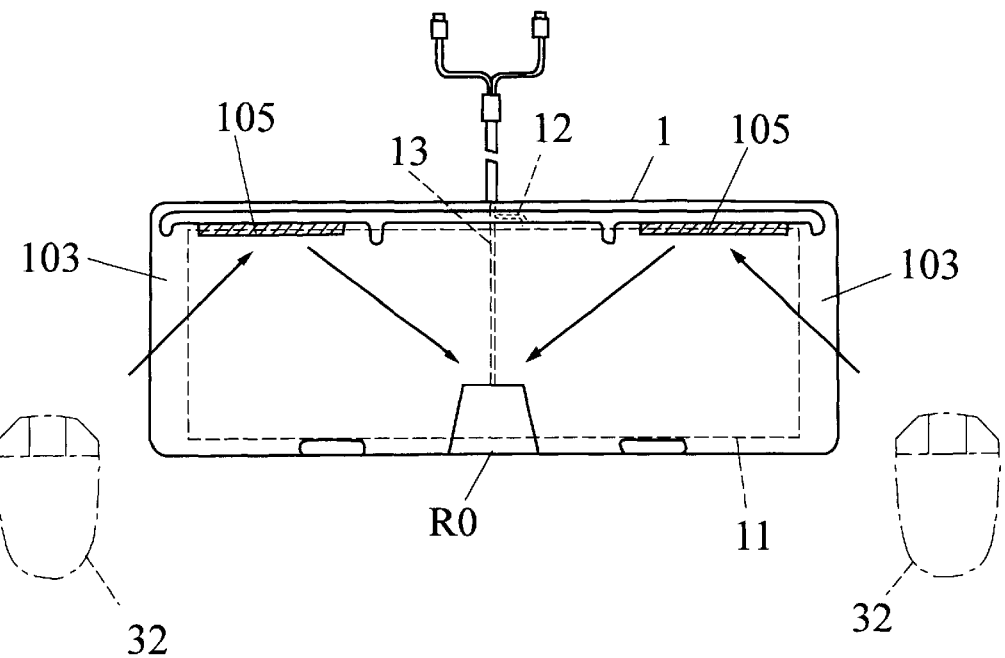
FIG. 18 is an illustration of the invention executed in wireless transmission coupling mode under an eleventh embodiment.
Figure 19:
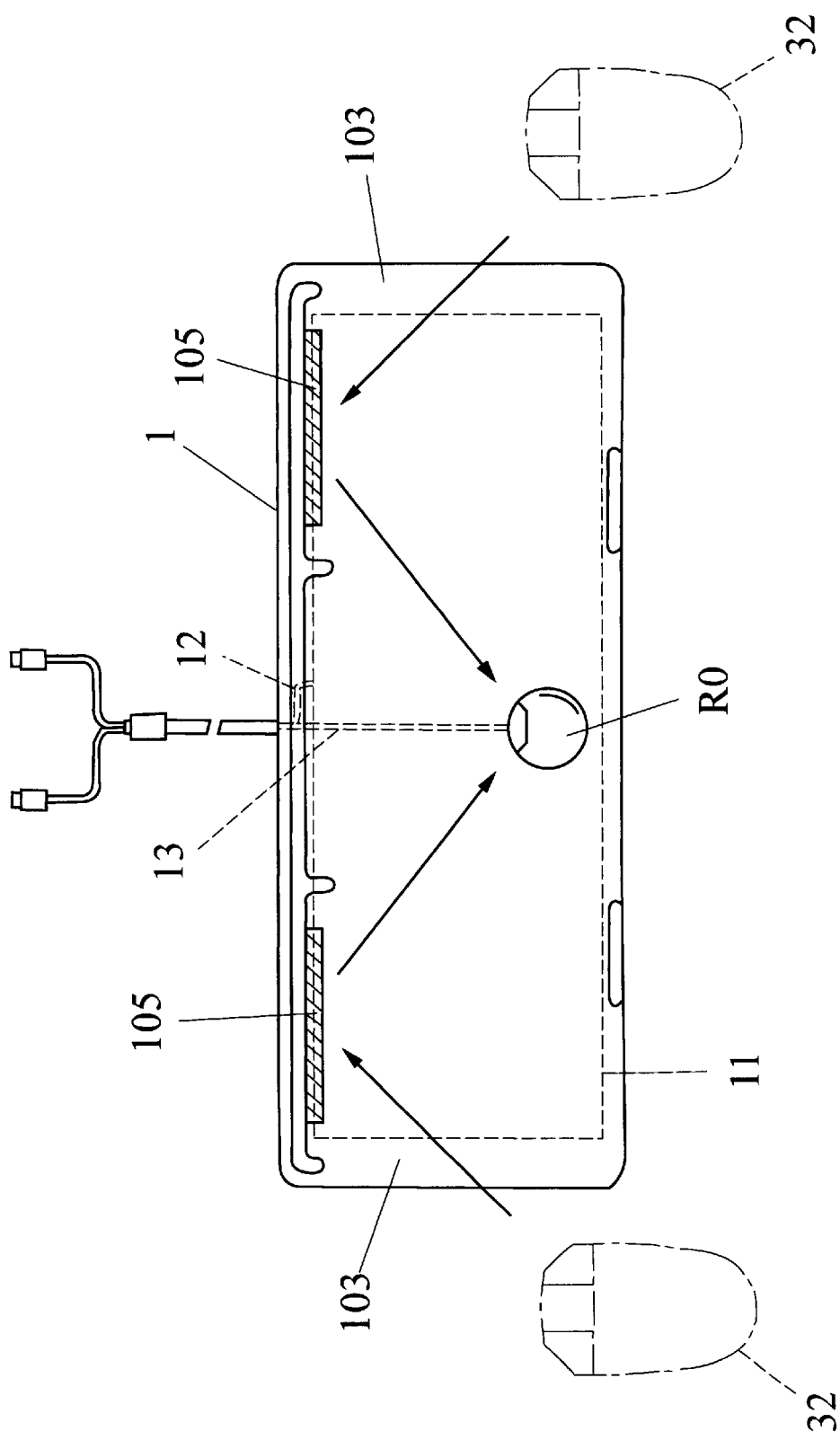
FIG. 19 is an illustration of the invention executed in wireless transmission coupling under a twelfth embodiment.

FIG. 18 shows an eleventh embodiment, meant for wireless coupling, including an infrared or ultrasound transmission mode of coupling, in which relay keyboard 1 again includes operational pushkeys on the surface complemented with corresponding pushkey circuits 11 which in turn are coupled to the main unit 2 by keyboard transmission wire 12. The keyboard 1 also features notch 103 for wireless transmission on either or both sides of the bottom of the chassis thereof. Relay wire 13 is located in a chosen spot inside the relay keyboard 1, with one end in the form of a row of wires extending side by side with keyboard transmission wire 12, or coaxial with a multiple-core cable, and connected directly or by means of a socketplug assembly to the main unit 2. The other end is coupled to the infrared or ultrasound receiver R0 which may be united piece by piece with the relay keyboard 1, or as per the twelfth embodiment illustrated in FIG. 19, structured integral with the infrared or ultrasound receiver R0, by attaching it to the upper, lower, or any side of the chassis of the relay keyboard 1. The bottom side of the relay keyboard 1 is, in addition, furnished with one or more refractors 105 on the interior wall, where suitable the refractor 105 being composed of one or more infrared or ultrasound signal reflectors of specific geometric configuration, mounted onto the inner wall of the relay keyboard 1. Alternatively, a selected position on the inner-wall of the relay keyboard 1 may be processed into a specific configuration and applied with material responsive to infrared or ultrasound waves or the chosen position may be applied with material reflective to incident infrared or ultrasound waves, in order that by the intervention of the refractor means 105 the infrared or ultrasound receiver R0 may pick up signals transmitted by the infrared or ultrasound emission circuit associated with the infrared or ultrasound wireless mouse or trackball device 32 installed independently on either or both sides, or any other chosen location relative to the relay keyboard 1. This arrangement will help eliminate the need for component-to-component shielding and interferenced effects, so that the overall layout on the desktop may turn out to be neat and clean beyond what was ever possible before.

Figure 20:
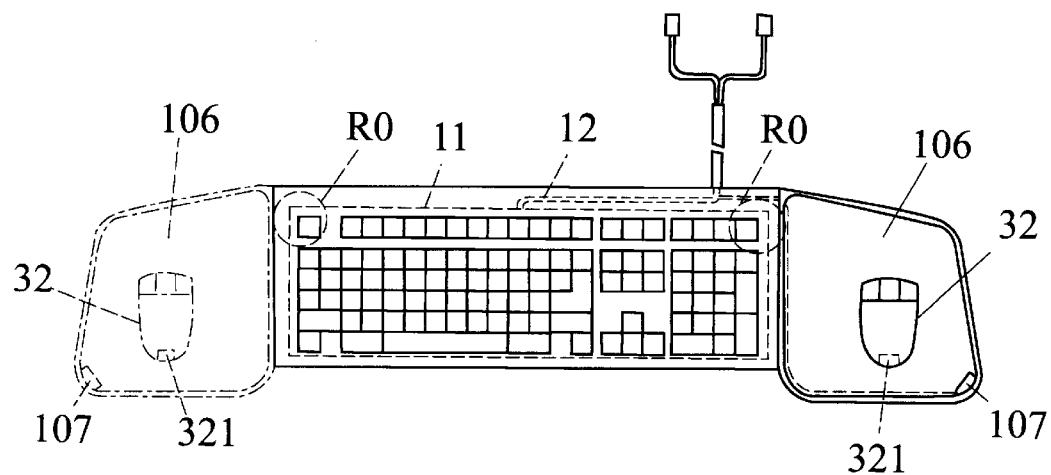
FIG. 20 is an illustration of the invention executed in wireless transmission coupling mode under a thirteenth embodiment.

In a thirteenth embodiment of the invention, as illustrated in FIG. 20, one or more separate or integral mouse pads 106 are provided on a chosen side and angle, or on both sides at a chosen angular setting, to serve as an operation platform for an independently installed wireless mouse or trackball device 32. In addition, a charging battery socket 107 may be installed on a chosen wall edge of the aforementioned mouse pad or pads 106, and a corresponding charging coupling assembly 321 may be installed at a corresponding position on the aforementioned infrared or ultrasound wireless mouse or trackball device 32, so as to offer charging of the infrared or ultrasound wireless mouse or trackball 32 during off-duty hours.

Figure 21:
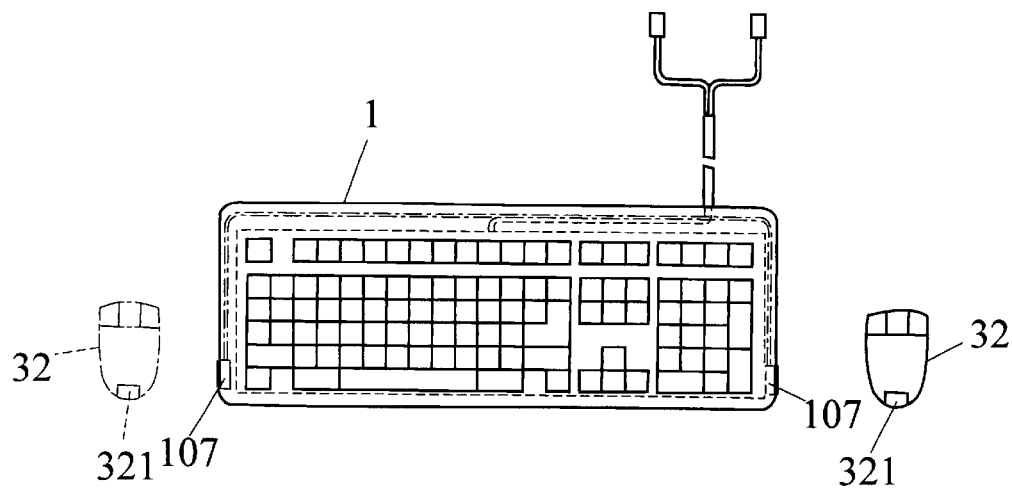
FIG. 21 is an illustration of the invention executed in wireless transmission coupling mode under a fourteenth embodiment.
Figure 23:
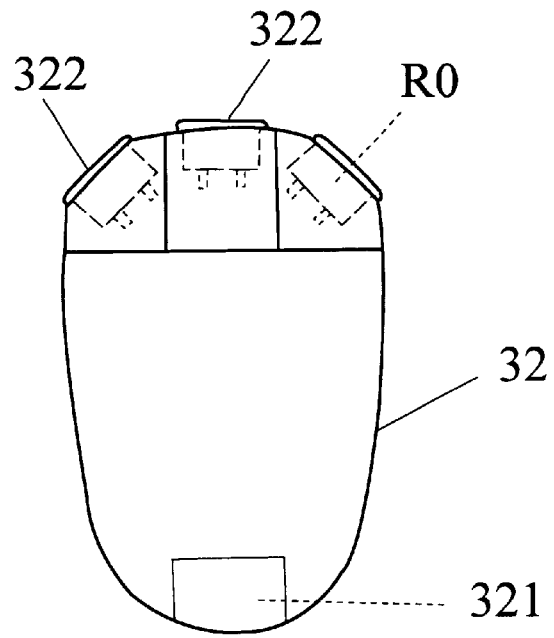
FIG. 22 through FIG. 25 illustrate other embodiments covering infrared or ultrasound wireless mouse or trackball devices constructed according to the invention.
Figure 22:
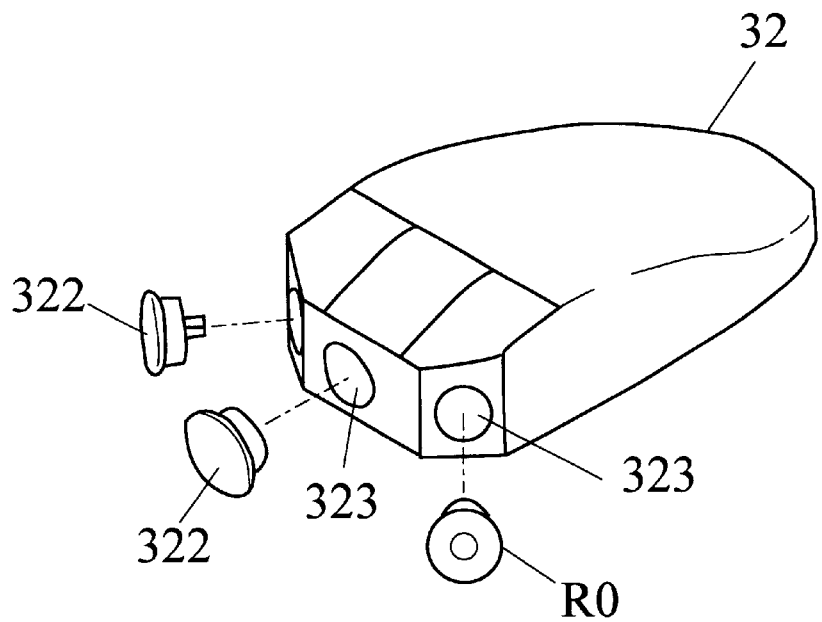
Figure 25:
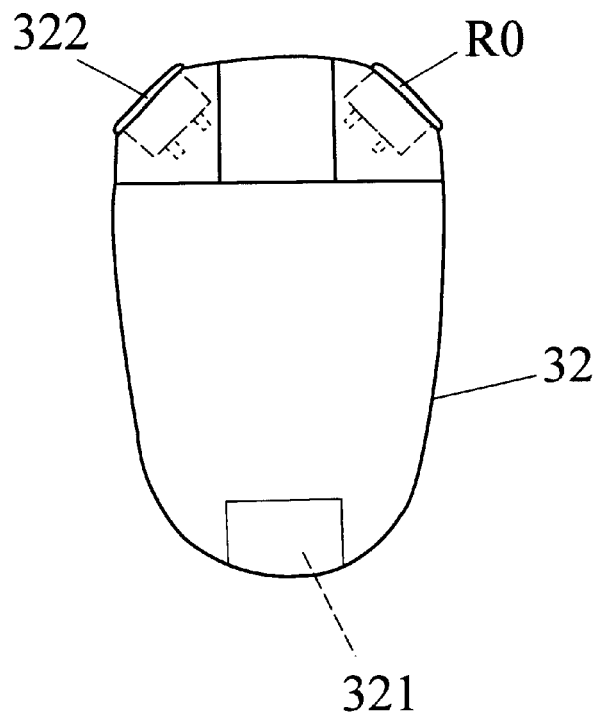
Figure 24:
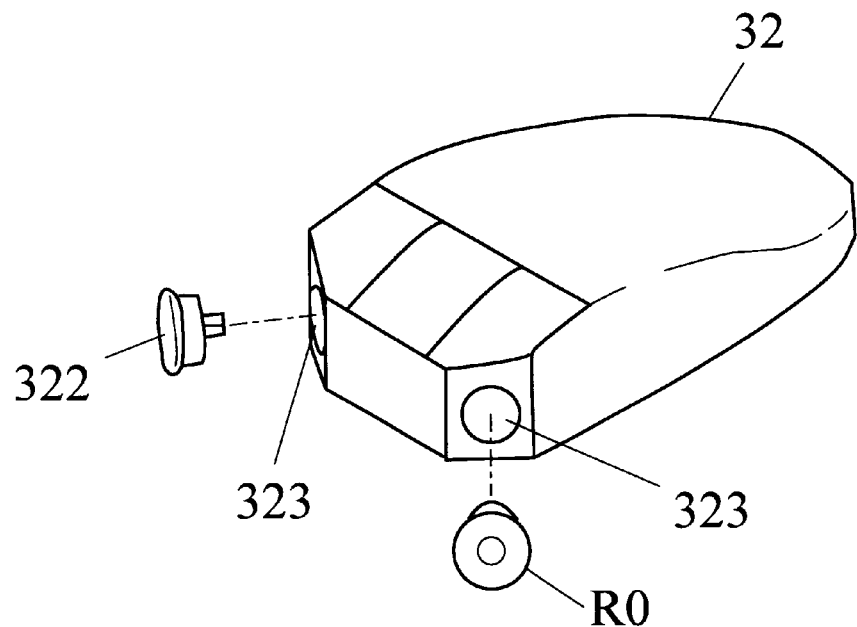

In a fourteenth embodiment of the invention assembly, as illustrated in FIG. 21, a charging socket assembly 107 relying for its power source on the main unit interface power supply may be installed on one side or both sides, or on a wall edge of a chosen angular setting on one or both sides of the relay keyboard 1, and a corresponding coupling assembly 321 may be installed on the infrared or ultrasound wireless mouse or trackball device 32, serving to charge same device 32 during off-duty hours.

Additionally, the independently installed infrared or ultrasound wireless mouse or trackball device 32, may not only incorporate one set of infrared or ultrasound emission circuit assembly comprising LED components for infrared or ultrasound transmission purposes, mounted at a chosen angular setting, but also may include the following features:

(1) Circuitry for providing one or more additional infrared signal receiving/transmitting channels incorporated into the infrared or ultrasound wireless mouse or trackball device 32 so as to provide two or more infrared or ultrasound emission orientations; each Tx/Rx port being separated from the casing by an infrared or ultrasound partition board or block 322 so as to admit selective blocking of a part of the Tx/Rx port 323 in compliance with operational requirements and thereby minimize interference, as illustrated in FIG. 22 through FIG. 25:

(2) Two or more sets of infrared or ultrasound emission units sharing a same set of emission circuit assemblies may be mounted at a chosen angular setting on the wireless mouse or trackball device, and switching means may be provided in parallel where needed to allow for selective operation of the infrared or ultrasound emission units as executed through right-hand or left-hand manipulations, as illustrated in FIG. 22 through FIG. 25:

(3) A socket allowing for accommodation of the emission circuit assembly 321 may be provided in two or more sets at a chosen angular setting in the emission head of the wireless mouse or trackball device 32, to allow for integration of emission circuit assembly 321 with a socket/plug assembly where needed, on one side, while the other side is isolated by an insulation plug 322;

(4) Apart from being expanded in a single dimension (ID), the emission angle of one or two infrared or ultrasound emission units for the wireless mouse or trackball 32, may be expanded in a third dimension.

Figure 26:
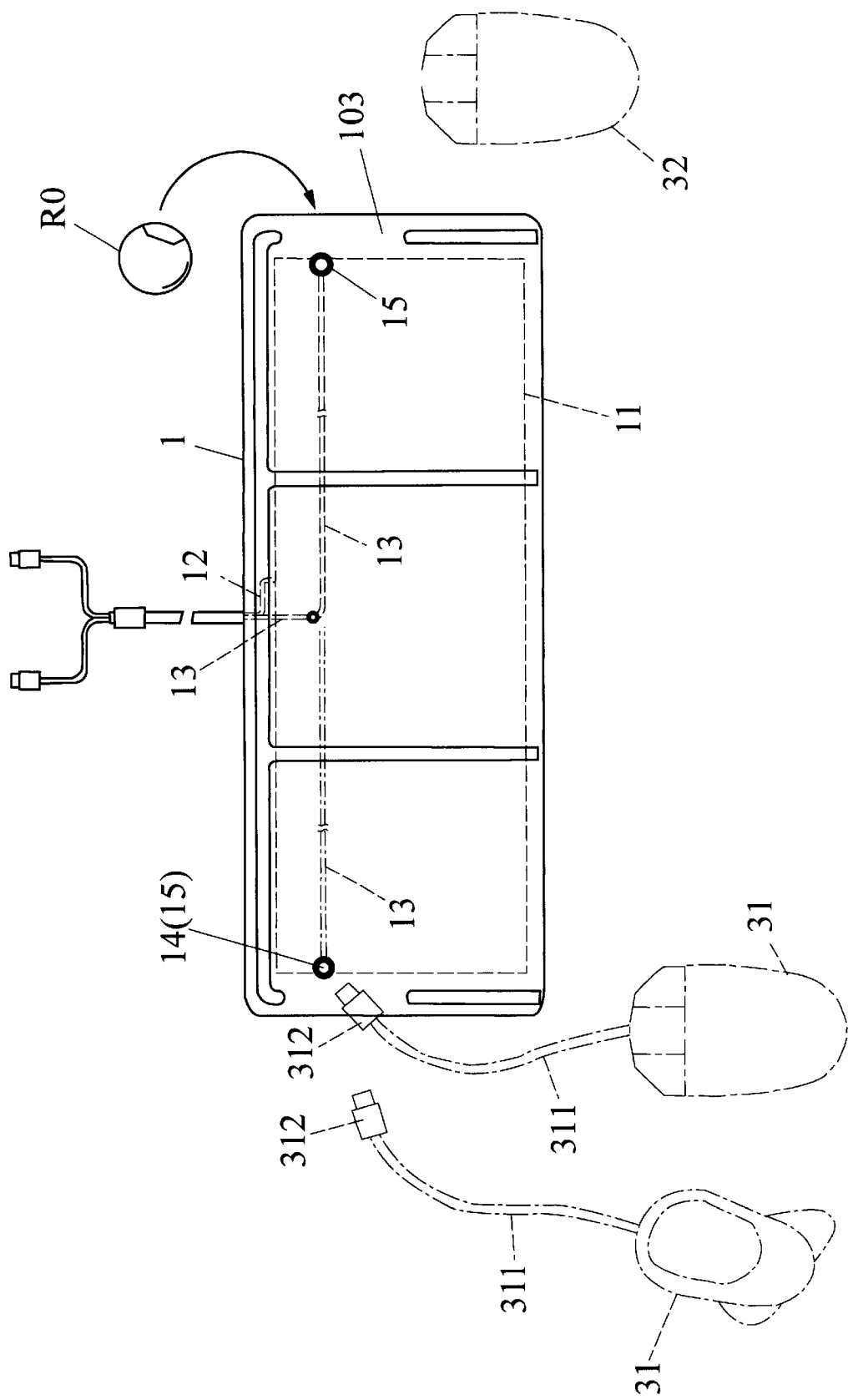
FIG. 26 illustrates the invention executed in a fifteenth embodiment pursuant to a wireless transmission mode.
Figure 27:
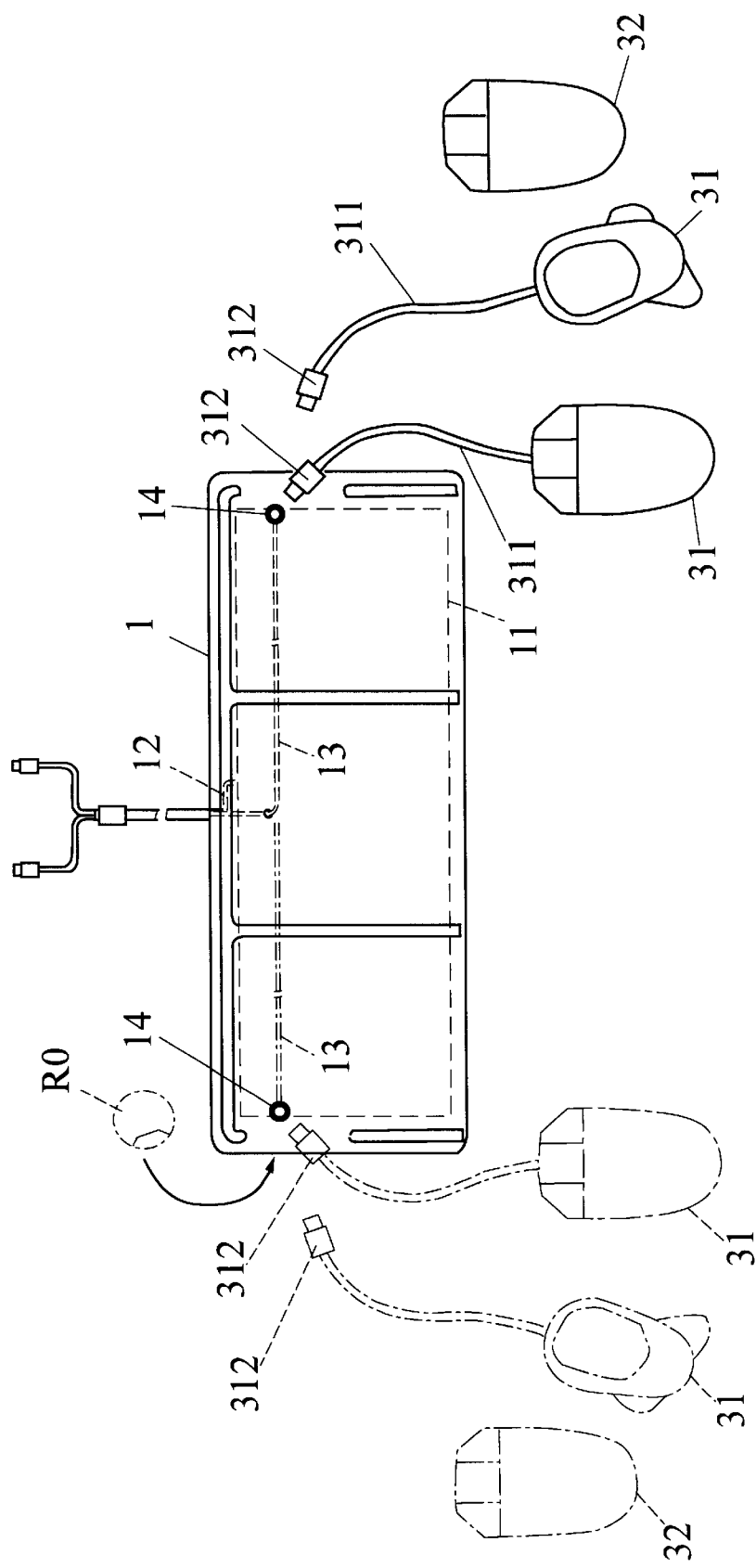
FIG. 27 illustrates the invention executed in a sixteenth embodiment pursuant to the wireless transmission mode.

In addition to accommodating the infrared or ultrasound receiver, R0, the conventional PS2, USB, serial, or any other special purpose interface plug or socket assembly 14 or 15 may instead accommodate wired mouse or trackball device 31 where needed. For example, where it is impractical to make use of the independently installed wireless mouse or trackball device 32, wireless arid wired systems can be applied equally effectively on a same rationale. Where, in any of the aforementioned instances, the conventional PS2, USB, serial or other special purpose interface plug or socket assembly 14 or 15 is employed singly or in two or more sets, it is also practicable to concurrently provide thereon one or more sets of (1) infrared receivers, (2) ultrasound receivers, (3) wired mouses, or (4) trackball devices 31, as represented in the fifteenth embodiment of the invention illustrated in FIG. 26, The two or more sets of plug or socket assembly 14 or 15 may further be mounted at other chosen locations which could be on two or more sides, or on one side and at least another position of the relay keyboard 1, with at least one side or one position being furnished with two or more similar or dissimilar plug or socket assemblies, as seen in the sixteenth embodiment of the invention illustrated in FIG. 27.

Figure 28:
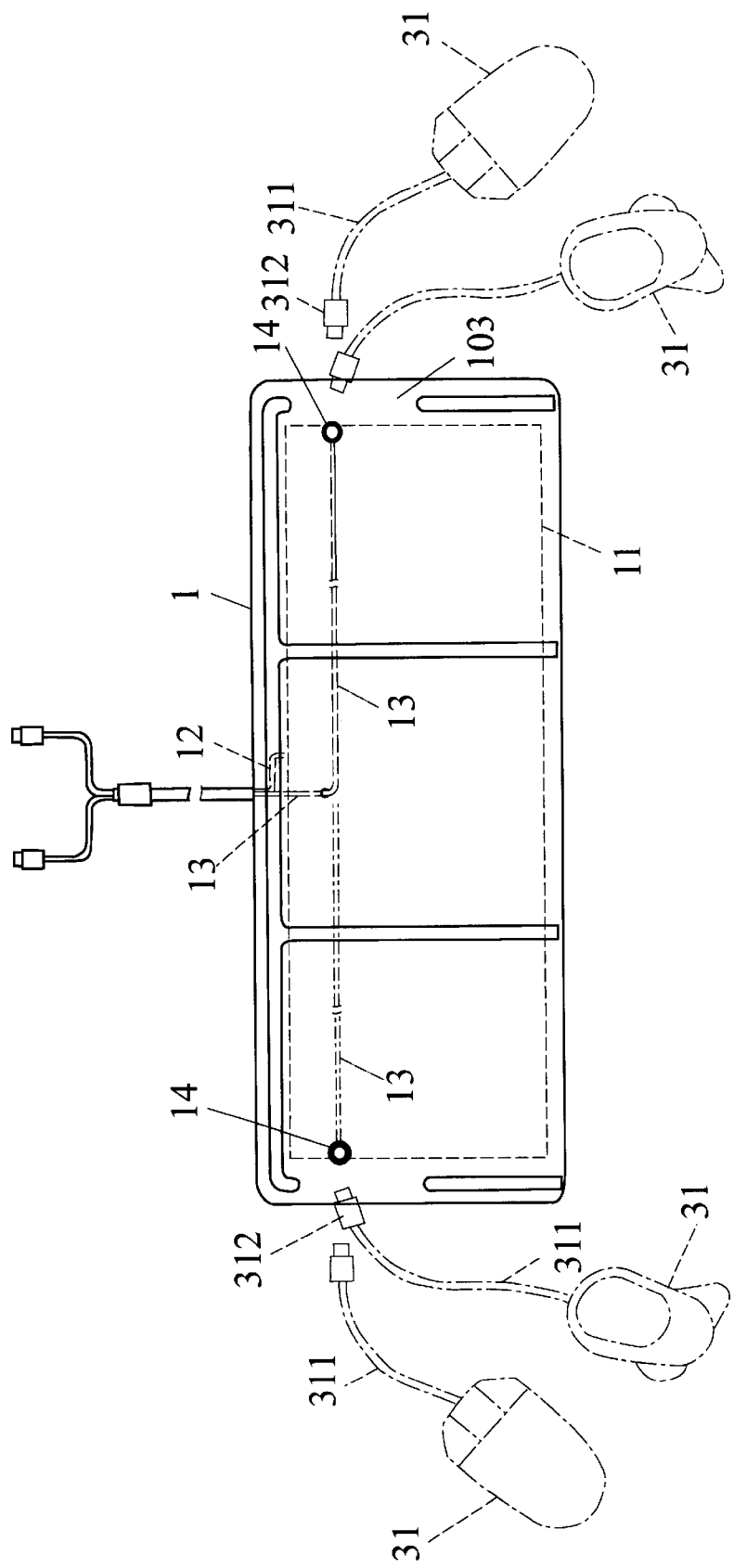
FIG. 28 illustrates the invention executed in a seventeenth embodiment pursuant to wireless transmission mode.
Figure 29:
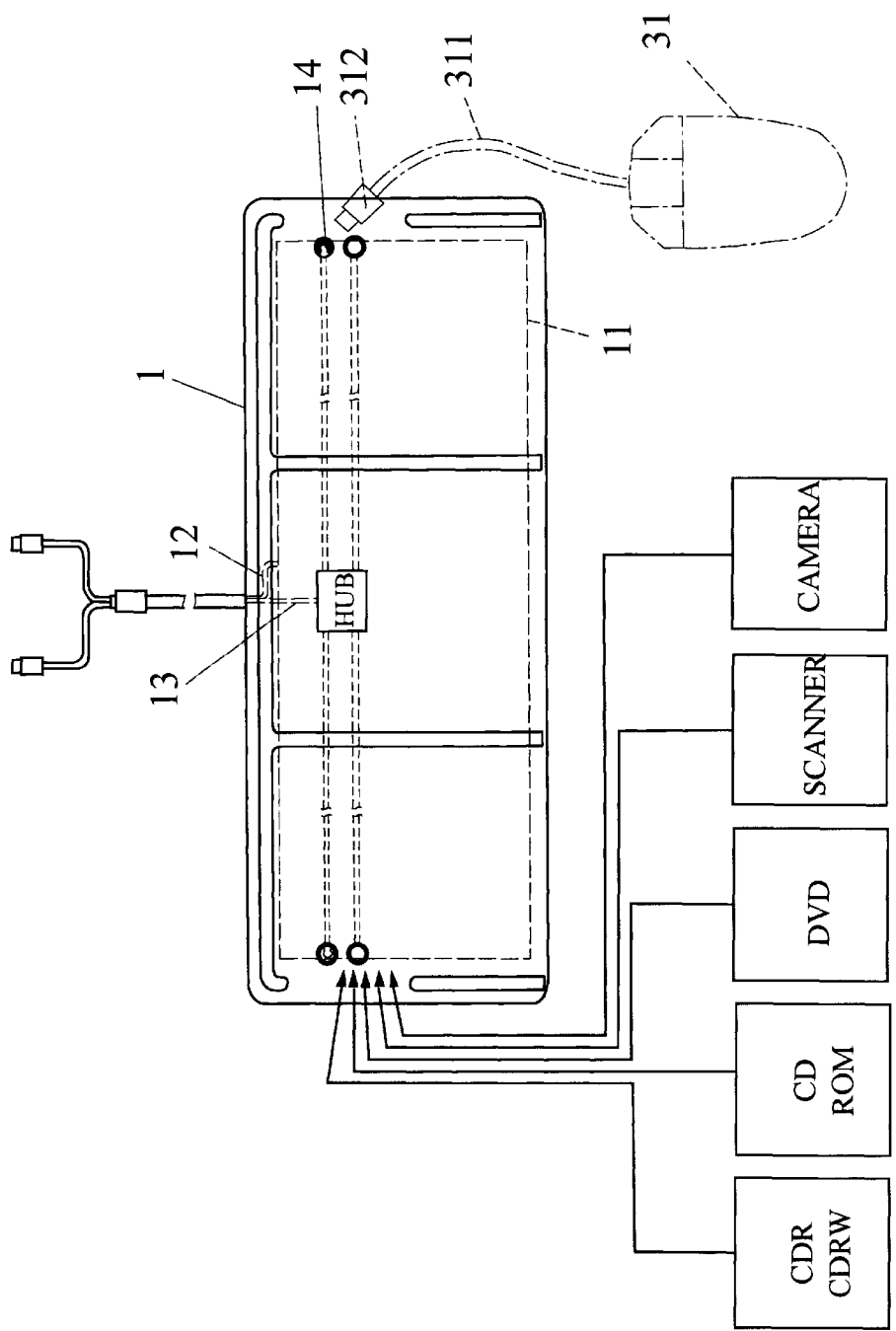
FIG. 29 illustrates the invention executed in an eighteenth embodiment pursuant to the wireless transmission mode.
Figure 30:
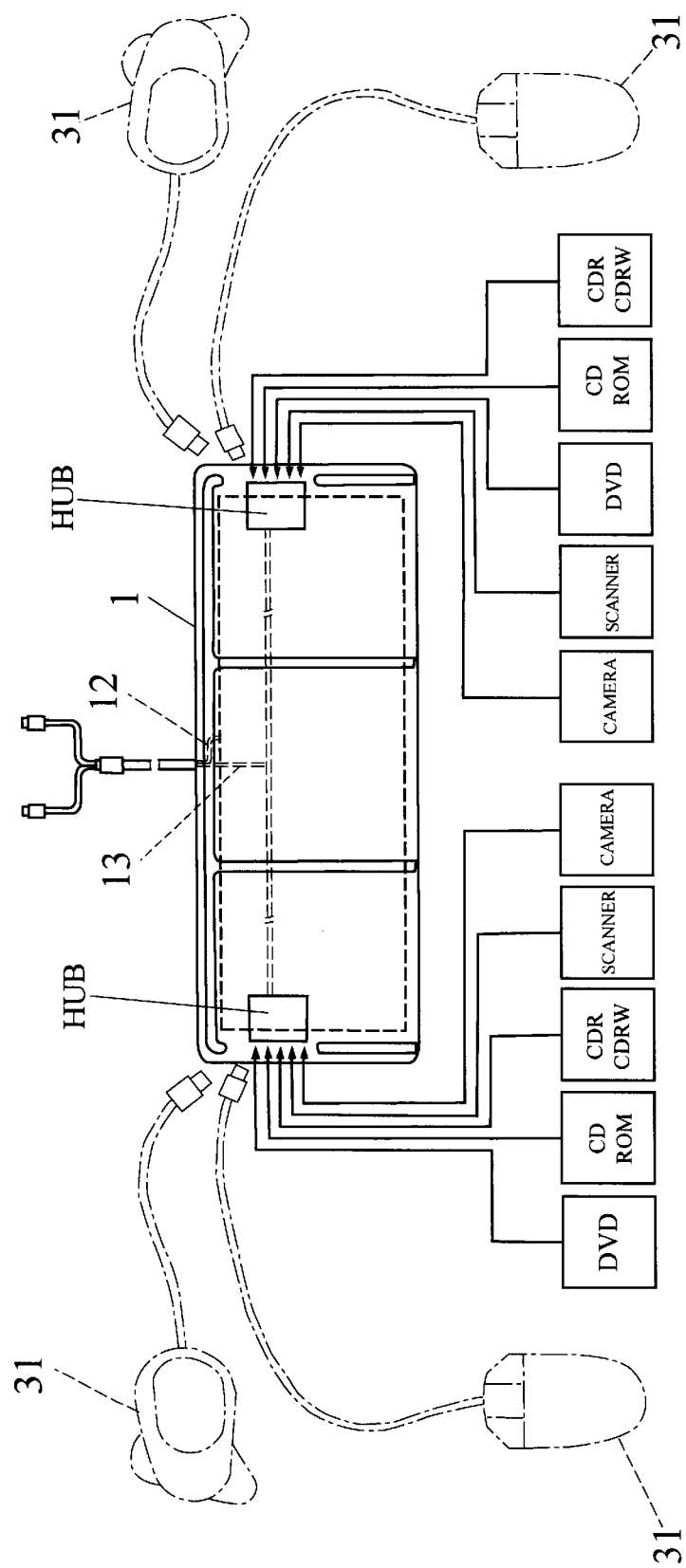
FIG. 30 illustrates the invention executed in a nineteenth embodiment pursuant to wireless mode of transmission.

Moreover, with the above-mentioned plug or socket assembly being furnished in two or more sets, each plug or socket may accommodate respectively a non-homogeneous wired mouse or trackball device 31, or any other electric control, and further may be equipped with switching means where needed or appropriate, according to a seventeenth embodiment of the invention illustrated in FIG. 28.

Where the aforementioned relay keyboard 1 is in the form of a built-in special purpose interface socket assembly comprising a universal series bus (USB), high speed transmission IEEE 1394 interface, or another interface socket assembly (HUB), it may accommodate setting of the infrared or ultrasound receiver R0, or wired mouse or trackball device 31, or provide interface access for units such as a DVD, CD ROM, CDR, CDRW, sweeping scanner, camera, microphone, speaker, or similar audio/video input/output assemblies or other electric controls, as exemplified by an eighteenth embodiment of the invention assembly illustrated in FIG. 29. Moreover, other positions are available for selection are present on the two or more sides, or one side and another location of the relay keyboard 1, and it may be also practicable for two or more sets of aforementioned USB, IEEE 1394, or other interface socket assemblies (HUB) with expansion capabilities to be accommodated to meet selection applications, as exemplified by a nineteenth embodiment of the invention illustrated in FIG. 30.

Among the numerous embodiments realizable pursuant to the invention the so-called infrared or ultrasound wireless coupling mode of execution is characterized such that, as associated with the relay keyboard 1, the infrared receiver including an infrared detector; or the ultrasound receiver including an ultrasound detector, may be structured in a standalone housing for possible union by means including locking, engagement, bonding, hooking, retaining, vacuum suction, magnetic absorption positioning techniques or any other conventional technique so that positioning of similar or dissimilar conventional PS2, USB, serial or other special purpose interface plug/socket assembly 14 may be accomplished at one time and the assembly 14 employed to connect to relay wire 13 positioned on the relay keyboard 1. Alternatively, the connection may be prosecuted directly by wire coupling, or both the keyboard and receivers may be structured integrally on a same common housing. If the aforementioned relay keyboard 1 and the infrared or ultrasound receiver R0 are mutually independent entities meant for selective combination where needed, then one side or both sides of the relay keyboard 1 must be furnished with an ad hoc position reserved for bonding, locking, engagement, dovetailing, coupling, hooking, vacuum suction, magnetic absorption of the relevant socket/plug assembly, or the corresponding layout may involve abutting by the edge, with notched space good for infrared or ultrasound wireless transmission being provided in order that once combined, the wireless mouse or trackball devices 32 may find themselves favorably positioned in place for transmission purposes, vis-a-vis the infrared or ultrasound receiver R0: the same teaching is true as of integrated symbiotic structure.

The various embodiments of the assembly of a mouse and/or trackball device permitting selection of the position of a chosen receiver in the operation of aforementioned infrared or ultrasound wireless coupling transmission, and are equally applicable to notebook computers in which the housing and the keyboard are integrated together.

More specifically, in notebook applications, the relay wire 13 is remodeled to connection inside the housing and the keyboard, with one end in line with the infrared or ultrasound receiver R0 which is equipped with wire cords for coupling to either side, right or left, of the keyboard compartment of the notebook computer in question.

All that has been disclosed hereinbefore serves but to illustrate some representative models of the present invention in terms of its technical contexts, and is not intended to be limiting.

What is claimed is:

1. An assembly for using a keyboard as an operational relay for a mouse or trackball device, comprising:
   a keyboard connected to a computer by a cable;
   a mouse or trackball device;
   at least one interface device for receiving signals from said mouse or trackball device and relaying said signals directly to said computer; and
   selective positioning means for mounting said interface device to selectively face at least one of a left side and a right side of the keyboard and thereby enable the same mouse or trackball device to be selectively coupled to said interface device so that said mouse or trackball device may be selectively coupled to the interface device from both the left side and the right side of the keyboard, depending on a preference of a user of the mouse or trackball device.

2. An assembly for using a keyboard as an operational relay for a mouse or trackball device as claimed in claim 1, wherein said interface device includes a connector located within said keyboard, said connector being connected to a relay lead extending from said keyboard to said computer and arranged to receive a complementary connector on a lead extending from said mouse or trackball, and wherein said selective positioning means includes notches on both the left and right sides of a base of the keyboard for accommodating said lead extending from the mouse or trackball device.

3. An assembly for using a keyboard as an operational relay for a mouse or trackball device as claimed in claim 1, wherein said mouse or trackball device is a wireless mouse or trackball device, wherein said interface device includes at least one wireless receiver, and wherein said selective positioning means includes notches on both left and right sides of said keyboard for accommodating said at least one wireless receiver, signals received by said at least one wireless receiver being coupled to said computer by a relay lead that extends from said keyboard to said computer.

4. An assembly for using a keyboard as an operational relay for a mouse or trackball device as claimed in claim 3, wherein said receiver is an infrared receiver.

5. An assembly for using a keyboard as an operational relay for a mouse or trackball device as claimed in claim 3, wherein said receiver is an ultrasound receiver.

6. An assembly for using a keyboard as an operational relay for a mouse or trackball device as claimed in claim 3, wherein said selective positioning means further includes at least one opening on both the left and right sides of the base of the keyboard for receiving at least one complementary pin extending from said at least one receiver.

7. An assembly for using a keyboard as an operational relay for a mouse or trackball device as claimed in claim 3, wherein said selective positioning means further includes a plurality of openings on both the left and right sides of the base of the keyboard for receiving complementary pins extending from said at least one receiver.

8. An assembly for using a keyboard as an operational relay for a mouse or trackball device as claimed in claim 3, wherein said receivers are coupled to said relay lead by a lead extending from said receiver, and mating connector structures on said relay lead and said lead extending from said receiver.

9. An assembly for using a keyboard as an operational relay for a mouse or trackball device as claimed in claim 1, wherein said selective positioning means further includes at least one opening on both the left and right sides of the base of the keyboard for receiving at least one complementary pin extending from said at least one receiver.

10. An assembly for using a keyboard as an operational relay for a mouse or trackball device as claimed in claim 1, wherein said selective positioning means further includes a plurality of openings on both the left and right sides of the base of the keyboard for receiving complementary pins extending from said at least one receiver.

11. An assembly for using a keyboard as an operational relay for a mouse or trackball device as claimed in claim 1, wherein said mouse or trackball device is a wireless mouse or trackball device, wherein said interface device includes a wireless receiver, and wherein said selective positioning means includes openings in a central area of a base of said keyboard, and complementary positioning pins extending from said wireless receiver for mounting said wireless receiver to said base of said keyboard so as to selectively face a right side or a left side of said keyboard, signals received by said at least one wireless receiver being coupled to said computer by a relay lead that extends from said keyboard to said computer.

12. An assembly for using a keyboard as an operational relay for a mouse or trackball device as claimed in claim 11, wherein said receiver is an infrared receiver.

13. An assembly for using a keyboard as an operational relay for a mouse or trackball device as claimed in claim 11, wherein said receiver is an ultrasound receiver.

14. An assembly for using a keyboard as an operational relay for a mouse or trackball device as claimed in claim 1, wherein said mouse or trackball device is a wireless mouse or trackball device, wherein said interface device includes a wireless receiver situated in a central area of a base of said keyboard and signal guiding structures for reflecting signals received from either the left or the right side of said keyboard to said wireless receiver situated in a central area of the base of said keyboard, said selective positioning means including means for mounting said signal guiding structures on left and right sides of said keyboard.

15. An assembly for using a keyboard as an operational relay for a mouse or trackball device as claimed in claim 14, wherein said receiver is an infrared receiver.

16. An assembly for using a keyboard as an operational relay for a mouse or trackball device as claimed in claim 14, wherein said receiver is an ultrasound receiver.

17. An assembly for using a keyboard as an operational relay for a mouse or trackball device as claimed in claim 1, wherein said signal guiding structures are reflective structures.

18. An assembly for using a keyboard as an operational relay for a mouse or trackball device as claimed in claim 1, further comprising mousepad structures extending from at least one side of said keyboard.

19. An assembly for using a keyboard as an operational relay for a mouse or trackball device as claimed in claim 1, further comprising a charging socket assembly built-into a wall of said keyboard.

20. An assembly for using a keyboard as an operational relay for a mouse or trackball device as claimed in claim 11, wherein said mouse or trackball device includes a plurality of wireless signal transmission structures for emitting wireless signals at different orientations to facilitate use of the mouse or trackball device on either side of said keyboard.

21. An assembly for using a keyboard as an operational relay for a mouse or trackball device as claimed in claim 1, wherein said interface device is arranged to receive and transmit signals from a plurality of different devices, including devices selected from the group consisting of a CD ROM device, a CDR device, a CDRW device, a DVD device, a scanner, and a camera.

22. An assembly for using a keyboard as an operational relay for a mouse or trackball device as claimed in claim 1, wherein said interface device includes a connector selected from the group consisting of a PS2, USB, and serial interface connector.

* * * * *